United States Patent [19]

Legge et al.

[11] Patent Number: 4,595,444
[45] Date of Patent: Jun. 17, 1986

[54] ISOSTATIC DIE AND METHOD FOR ASSEMBLY OF SKELETAL STRUCTURES

[75] Inventors: John R. Legge; Charles E. Nunley, both of Huntsville, Ala.

[73] Assignee: United Technologies Corporation, Hartford, Conn.

[21] Appl. No.: 551,748

[22] Filed: Nov. 14, 1983

[51] Int. Cl.⁴ .................. B21K 3/04; B23P 15/04; B32B 31/20
[52] U.S. Cl. .................. 156/285; 29/156.8 B; 29/156.8 H; 156/382; 244/132
[58] Field of Search .............. 156/285, 382, 290, 292, 156/323; 72/63; 29/156.8 B, 156.8 H, 421 R; 244/35 R, 123, 132

[56] References Cited

U.S. PATENT DOCUMENTS

| | | | |
|---|---|---|---|
| 3,628,226 | 12/1971 | Nelson | 29/156.8 H |
| 3,736,638 | 6/1973 | Stone | 156/323 |
| 4,089,456 | 5/1978 | Toppen et al. | 29/156.8 H |
| 4,383,426 | 5/1984 | Legge | 29/156.8 B |

Primary Examiner—Caleb Weston
Attorney, Agent, or Firm—Robert P. Hayter

[57] ABSTRACT

A pair of strongbacks having a plurality of particularly sized plates positioned thereon are aligned on either side of a wing structure. The plates on the strongback bridge openings formed by the ribs of the skeletal framework for the wing preventing deformation of the unsupported curvilinear aerodynamic surface of the wing. A bonding chamber includes a flexible bladder and allows the strongbacks to act as an isostatic, and selective die.

5 Claims, 2 Drawing Figures

ISOSTATIC DIE AND METHOD FOR ASSEMBLY OF SKELETAL STRUCTURES

DESCRIPTION

1. Technical Field

This invention relates to an apparatus and a method for skeletal construction and, more particularly, to a novel apparatus and method attaching a metallic skin to a skeletal wing frame.

2. Background Art

An assortment of methods are known for the attachment of a skin to a framework. Die constructions generally involve the use of one or more dies designed to provide uniform force over a surface which is to be bent, or shaped, to conform with the surface of the die. Certain aerodynamic shapes, such as wings, have a leading edge and a trailing edge with a complex curvilinear surface therebetween. In addition, the thickness of the wings also varies from its point of attachment on the airframe to the tip of the wing. Because aerodynamic surfaces must conform to rather critical tolerances, great care must be exercised in the formation and assembly of such structures to ensure that it will conform to the final inspection tolerances or limits.

Of interest in the field of critical surface construction is U.S. Pat. No. 4,383,426 issued May 17, 1983 to J. R. Legge for "Die Construction for Fan Blades", this patent being commonly assigned. The die construction described in this patent is particularly useful for forming or reforming a fan blade to press dies containing cooperating cavities. A diaphragm is incorporated to apply pressure against a blade in a selected area.

DISCLOSURE OF INVENTION

It is an object of the present invention to provide a novel method and construction apparatus for attaching a metallic skin to a skeletal frame to form a high tolerance aerodynamic surface.

A feature of the present invention involves the use of a flexible bladder positioned over a strongback containing a number of particularly sized and located plates which apply pressure to the metallic skin so as to not deform unsupported skin surfaces in the bonding process.

The foregoing and other objects, features and advantages of the present invention will become more apparent from the following description of preferred embodiments and accompanying drawings.

BEST MODE FOR CARRYING OUT THE INVENTION

Figure 1:
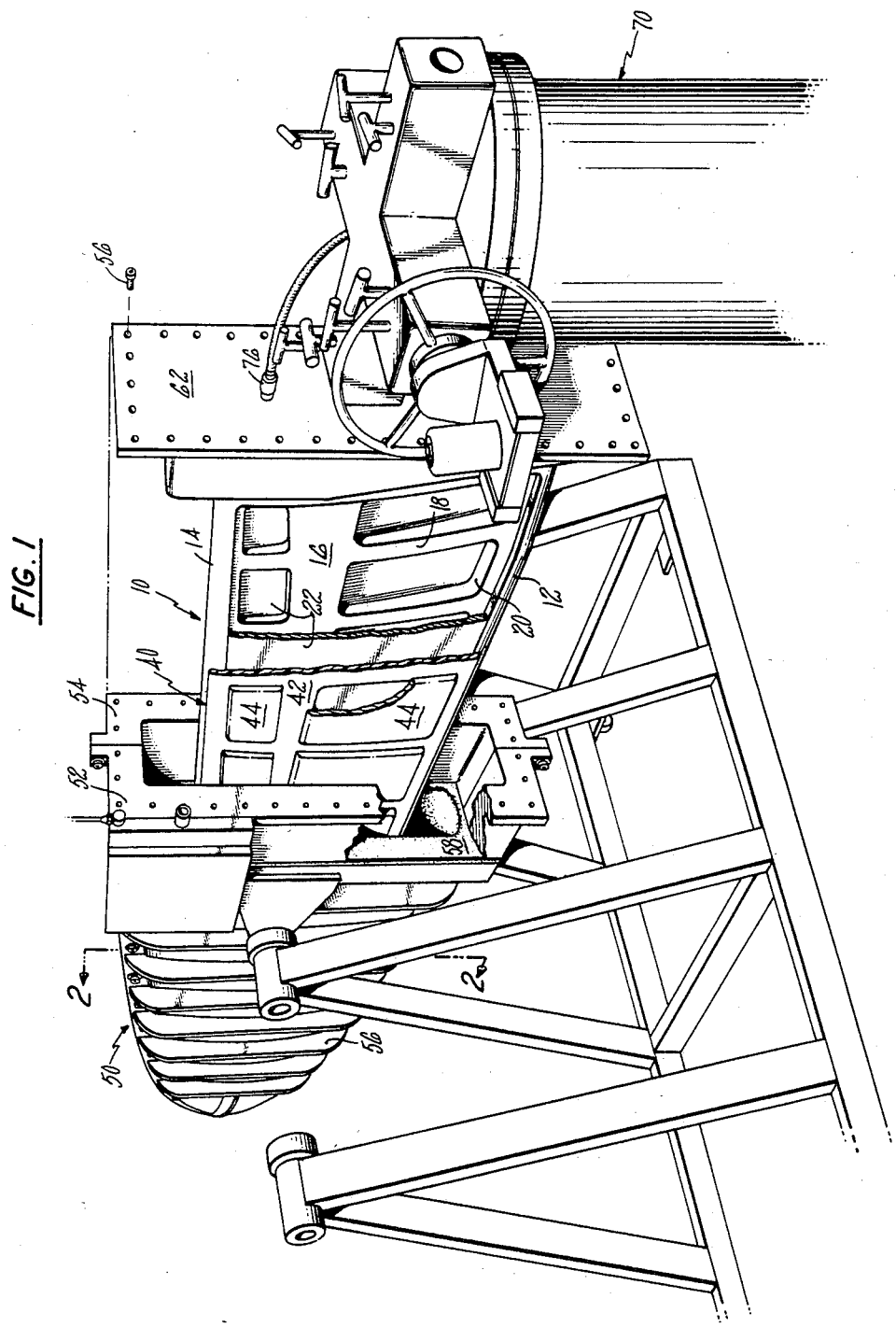
FIG. 1 is a perspective view showing the wing structure, with cutaway portions, together with the pressurized vessel employed in the construction process.

Referring first to FIG. 1, the apparatus employed in accordance with the present invention for attaching a metallic skin to a skeletal-like frame is seen in a partially exploded form. A frame 10 of a skeletal type is often used in the construction of a wing, or other aerodynamic lift surface so that it is both light and strong. The circumference of the frame 10 includes a leading edge 12 and a trailing edge 14, which generally define the perimeter size of the frame 10. A central rib 16 extends from a wing mounting point (not shown) axially along the central portion of the frame 10 to the point where it merges with the perimeter portion of the frame 10 near the wing tip (not shown). Lateral ribs, such as rib 18, are integrally formed with the perimeter members and central rib 16 adding rigidity to the structure, and define a number of openings 20. A metallic skin 22, cut and formed from a piece of sheet aluminum, or the like, must be fixedly attached to the frame 10 by bonding or other means to form the aerodynamic wing surface. At this point it should be understood that the just described wing structure is well known in the art and the above description should be considered background for the present invention.

As mentioned briefly hereinbefore, a particular problem that can occur in the construction of the type of wing above described is the deformation of the metallic skin into the openings of the frame during manufacturing. Since it is particularly important that the contoured curvilinear exterior surface of the wing conform to narrow design tolerances, any deformation associated with the fabrication process is undesirable. The apparatus and method of the present invention are unusually effective in the assembly of wings having a skin over a skeletal-type framework without such deformation.

An important aspect of the present invention involves a strongback 40 which is sized to cooperate with the components of the wing to ensure that pressure is only exerted against those portions of the skin 22 which are adjacent the rib structure, i.e., a selective die. The strongback 40 comprises a sheet 42, fabricated from a teflon or other similar slightly flexible material, sized such that it substantially conforms to the shape of the frame 10. A plurality of strongback plates 44 are fixedly mounted on the sheet 42 at specific locations adjacent the openings 20 in the frame 10. Each plate 44 is sized so that it overlaps its corresponding opening 20 in the frame 10 by about ¼ of an inch. The under surface around the perimeter of each plate 44 is shaped to generally conform to its matching contoured curvilinear surface on the wing. In the fabrication process, the strongback 40 acts as opposed dies exerting pressure on the skin 22, on the strongback plates 44 and is transferred to the rib portion of the skeletal frame 10 adjacent each openings 20.

Figure 2:
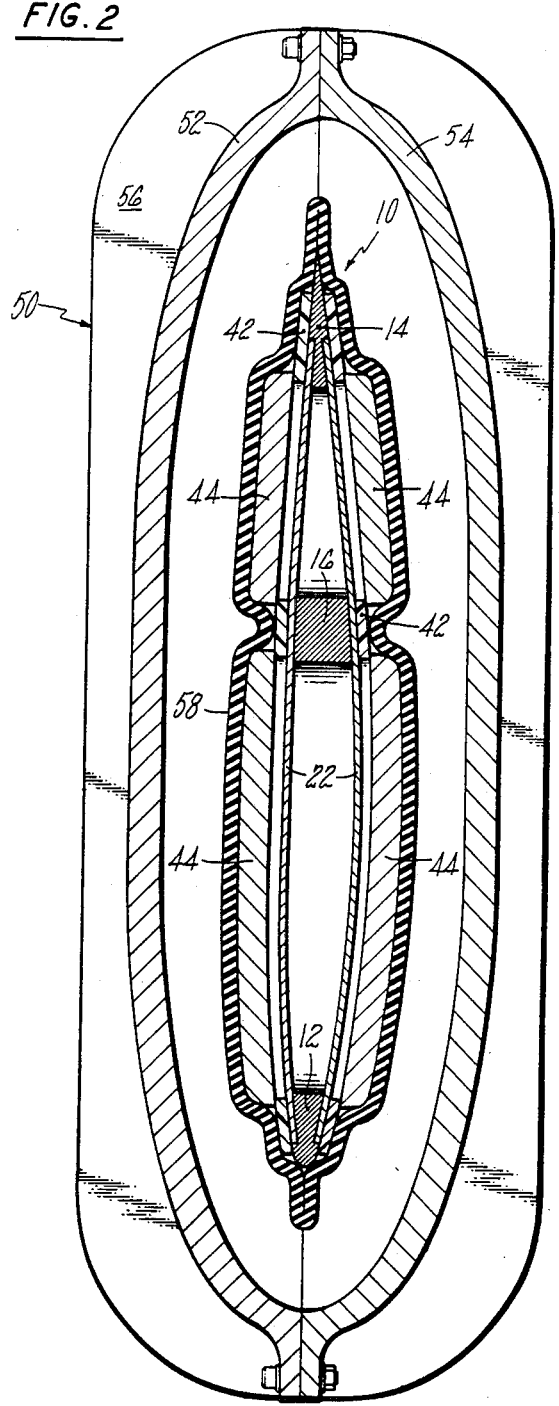
FIG. 2 is a cross-sectional view taken along line 2—2 of FIG. 1 and shows the flexible bladder and strongback exerting pressure on selected areas of the skin against the skeletal frame.

Another important feature of the present invention involves a novel chamber 50, and associated apparatus, which is used to rapidly construct a wing assembly in a minimal amount of time and effort. A preferred embodiment of the chamber 50 comprises half sections 52 and 54, the combination being shaped and sized in a manner to accommodate the wing. A plurality of flanges 56 extend laterally across each section 52 and 54 for strengthening the chamber. Conventional bolts releasably hold the half sections 52 and 54 together. A flexible bladder 58 (FIG. 2) is provided and is sized to receive the wing assembly therein. A head 60 fits against the end face of the half sections 52 and 54 sealing against the top of the bladder 58. A head cover 62, on which the frame 10 may be attached in the fabrication process, can then close the top of the chamber A related, and equally important, aspect of the present invention involves the assembly of a wing without damaging or deforming the contoured curvilinear surface formed by the skin 22. A stand 70 having multiple stations thereon may be used to construct a number of wing assemblies simultaneously. With the head cover 62 held in the stand 70, the frame 10 can be easily rotated about a horizontal axis. With one side of the frame 10 facing upwardly, a suitable adhesive is applied to the ribbed surface of the frame 10. If desired, the adhesive is rolled to fully distribute it and to remove any air bubbles. Next, the skin 22 is positioned on the frame 10 and aligned by guide pins (not shown), or other means, to fit against the frame. The strongback 40 is carefully set against the skin surface and aligned with the guide pins such that the strongback plates 44 bridge the openings 20. The frame is rotated and the process is then repeated for the skin 22 on the opposite size of the frame 10.

If desired, a vacuum bag (not shown) can then be placed over the entire wing assembly and sealed at its upper end against the underside of head cover 62 to provide a vacuum seal. A partial vacuum within the wing assembly is with an air pump withdrawing air through a port 76 to rigidly hold the skin 22 and strongback plates 44 tightly in place.

Laterally extending pins on the side of the bonding chamber are rotatably held on a movable rack moved between a horizontal and vertical orientation. The rack can then be rolled such that the wing assembly is moved into the bonding chamber until the head cover 62 contacts the head 52. Once the chamber is sealed, the head cover 62 is released from the stand 70 and the bonding chamber can be rotated to its upright position in the rack. With the bonding chamber in the vertical position, the vacuum pressure is then released and a positive pressure is supplied thereto, approximately 9 psi, to urge the bladder 58 snuggly against the strongback 40. Finally, the rack with one or more of the bonding chambers mounted thereon, is placed in an oven which is then heated to the temperature specified by the manufacturer for the curing of the adhesive.

As mentioned, it should be understood that a number of bonding chambers could be mounted in the rack at the same time allowing simultaneously curing in an oven. This is particularly desirable in a large-scale manufacturing process where large numbers of wings are to be fabricated in a short time period.

Although this invention has been shown and described with respect to a preferred embodiment, it will be understood by those skilled in the art that various changes in form and detail thereof may be made without departing from the scope of the claimed invention.

We claim:

1. An assembly for the attachment of a skin to a skeletal frame of the type of which has various ribs defining open portions therethrough, comprising:
   a first die means including a sheet on which a plurality of particularly sized rigid plates are fixedly mounted, said first die being positioned on one side of said skeletal frame against said skin;
   a second die means including a sheet on which a plurality of particularly size rigid plates are fixedly mounted thereon, said rigid plates on said second die and said rigid plates on said first die being oppositely aligned and bridging the openings in said skeletal frame;
   a chamber, sized to receive an assembly comprised of said first die means and said second die means, including a flexible bladder sized to enclose said first die means and said second die means; and
   fluid pressure means for supplying a fluid under pressure to said chamber for urging said flexible bladder and said plurality of particularly sized rigid plates bridging the opening in said skeletal frame against the rib portion of said skeletal frame thereby preventing deformation or damage to said skin adjacent openings in said skeletal frame.

2. An assembly according to claim 1, wherein said chamber includes a detachable head cover which releasably holds one end of said frame for positioning the same in a space configuration within said chamber.

3. An assembly according to claim 2, wherein said head cover can be releasably mounted on a stand such that said assembly is rotatable along a horizontal axis.

4. A structure according to claim 1, wherein said skeletal frame is a wing frame and wherein said skin is a particularly shaped curvilinear metallic surface which acts as an aerodynamic surface.

5. A method for attaching a skin to a skeletal frame of the type having ribs defining a plurality of openings, comprising:
   applying a settable adhesive to said ribbed portion of said skeletal framework;
   positioning a first skin on said skeletal frame;
   positioning a first die having a plurality of particularly sized plates thereon against said first skin such that each of said plates bridges one of said openings in said skeletal frame;
   positioning a second skin on the opposite side of said frame;
   positioning a second die having a plurality of particularly sized plates thereon against said second skin such that said plates are aligned with corresponding plates on said first die and bridge said openings in said frame;
   placing such assembly in a bonding chamber containing a flexible bladder;
   supplying a fluid under pressure to said bonding chamber to urge said flexible bladder against said first die and said second die; and
   removing said assembly from said chamber and removing said first die and said second die.

* * * * *